3,333,329
METHOD FOR PLACING ONE OR MORE ELECTRICAL COILS IN DESIRED SPACIAL RELATIONSHIP WITH RESPECT TO A COIL-ACCOMMODATING MEMBER
Clovis E. Linkous, Fort Wayne, Ind., assignor to General Electric Company, a corporation of New York
Filed Nov. 30, 1964, Ser. No. 414,823
10 Claims. (Cl. 29—596)

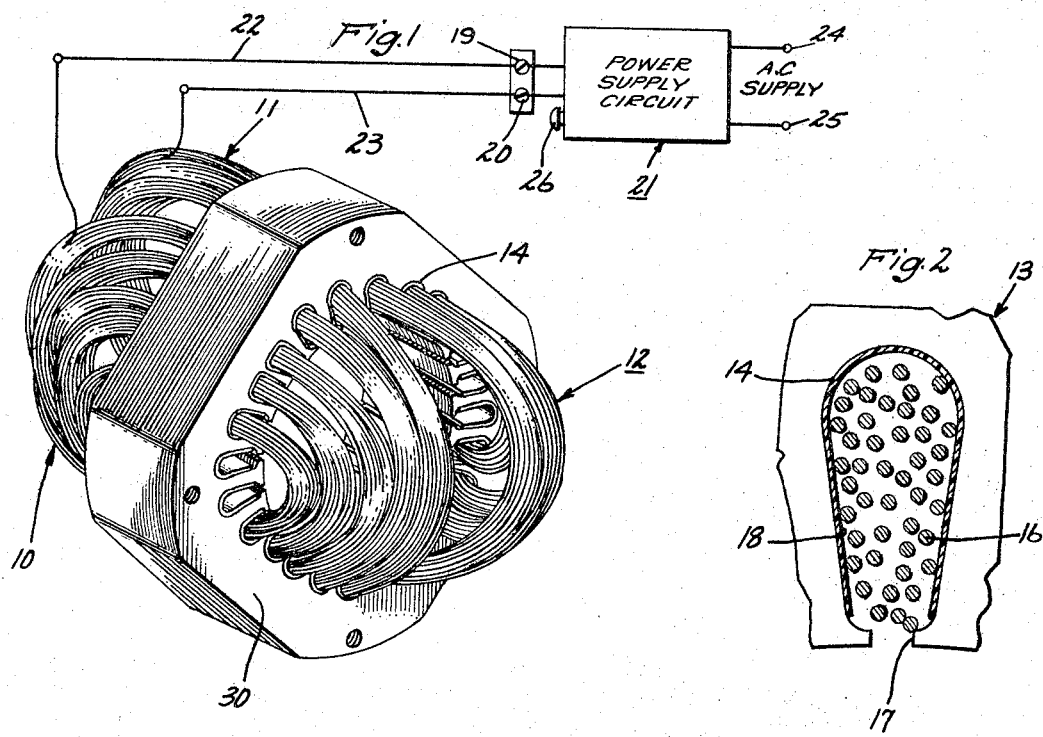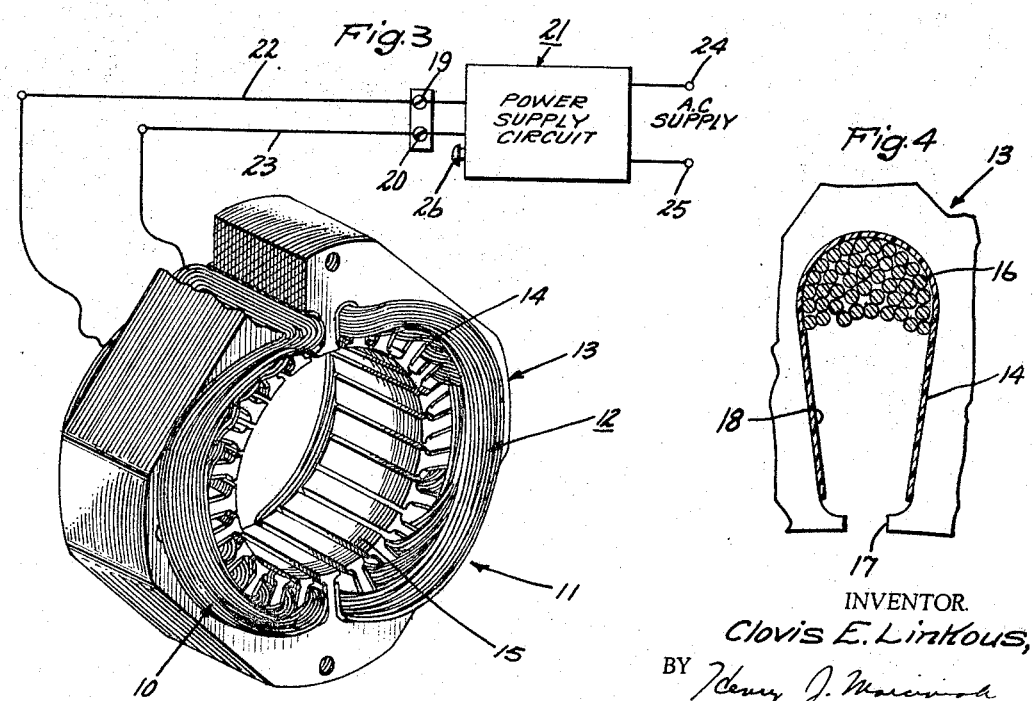

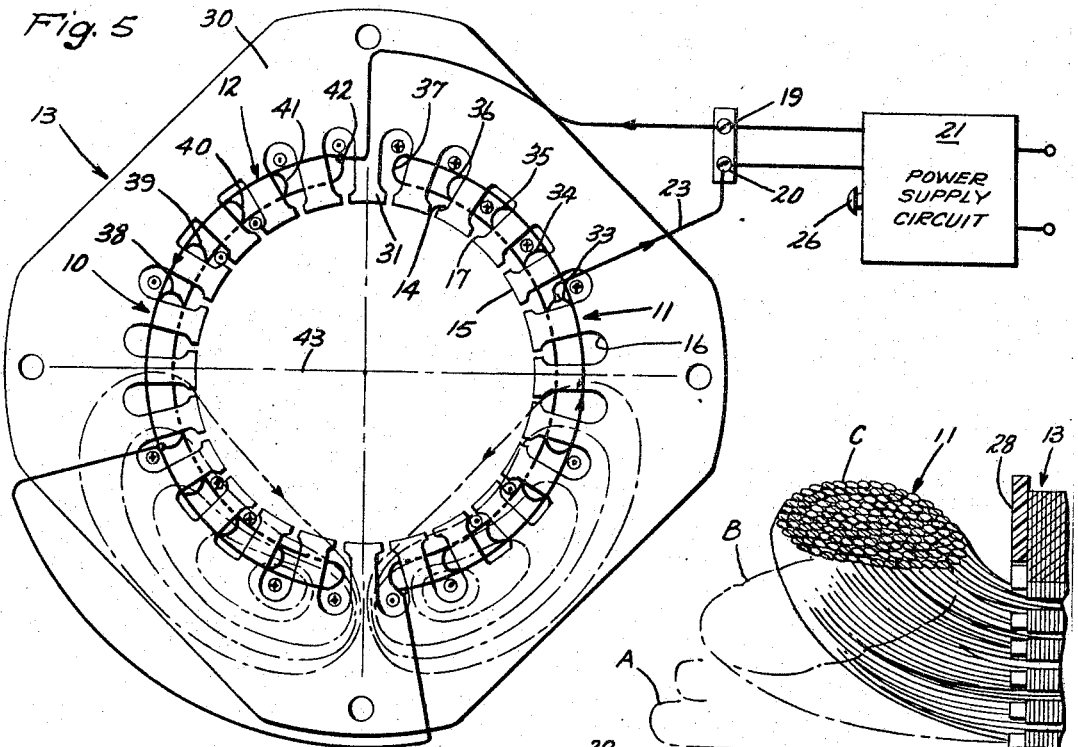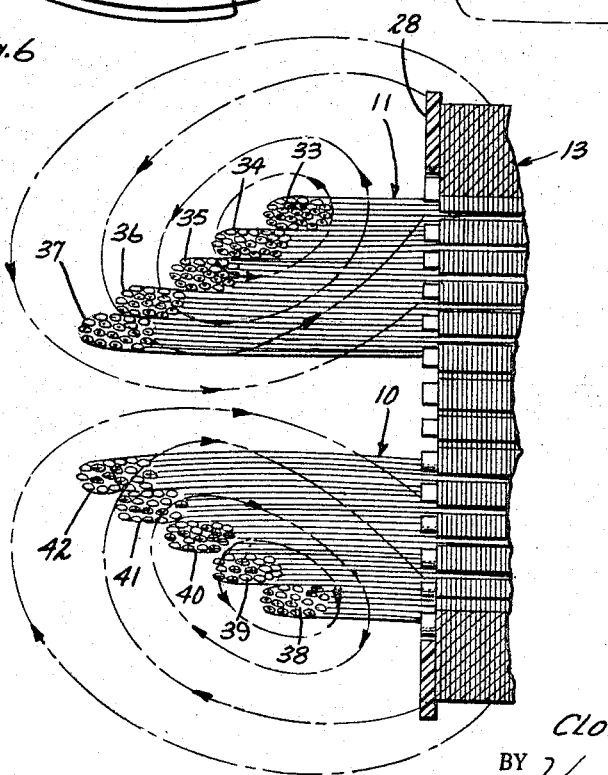

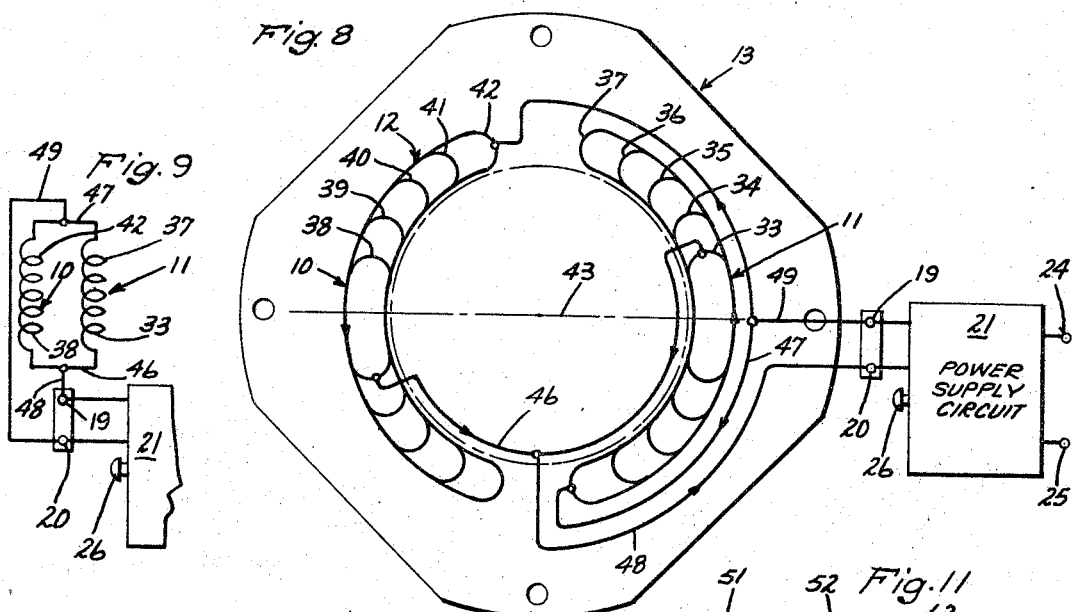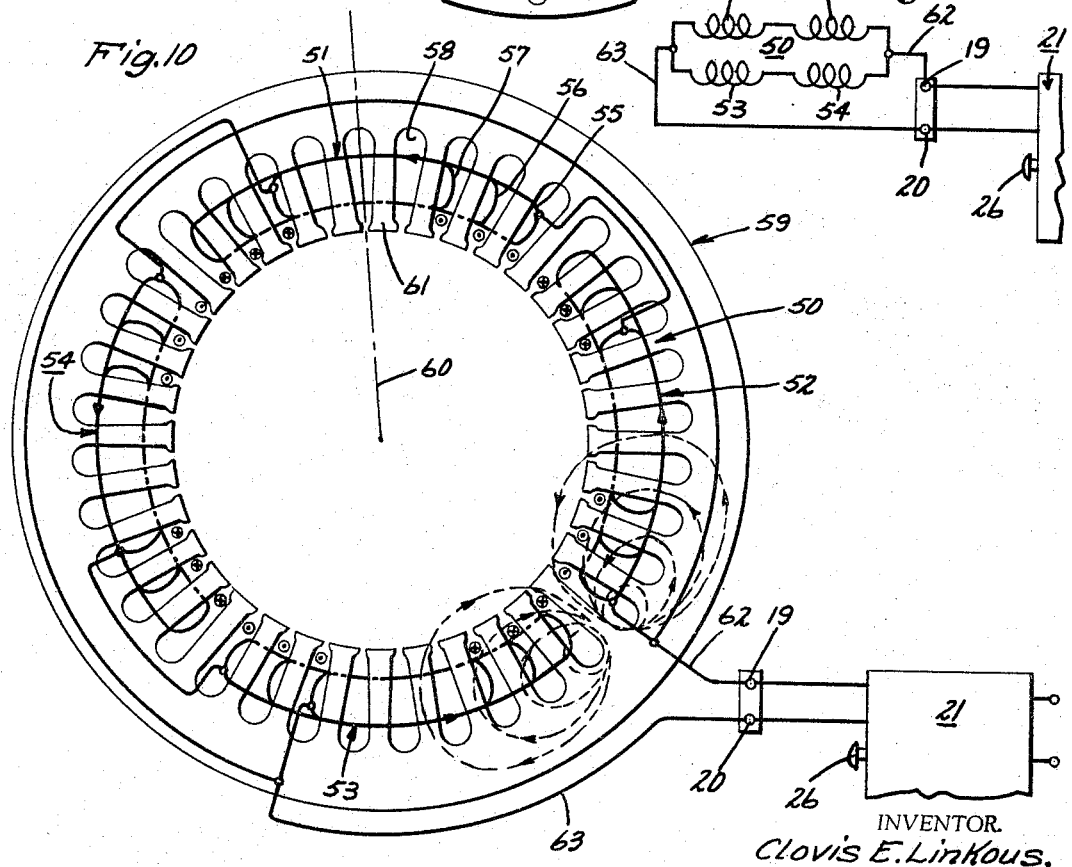

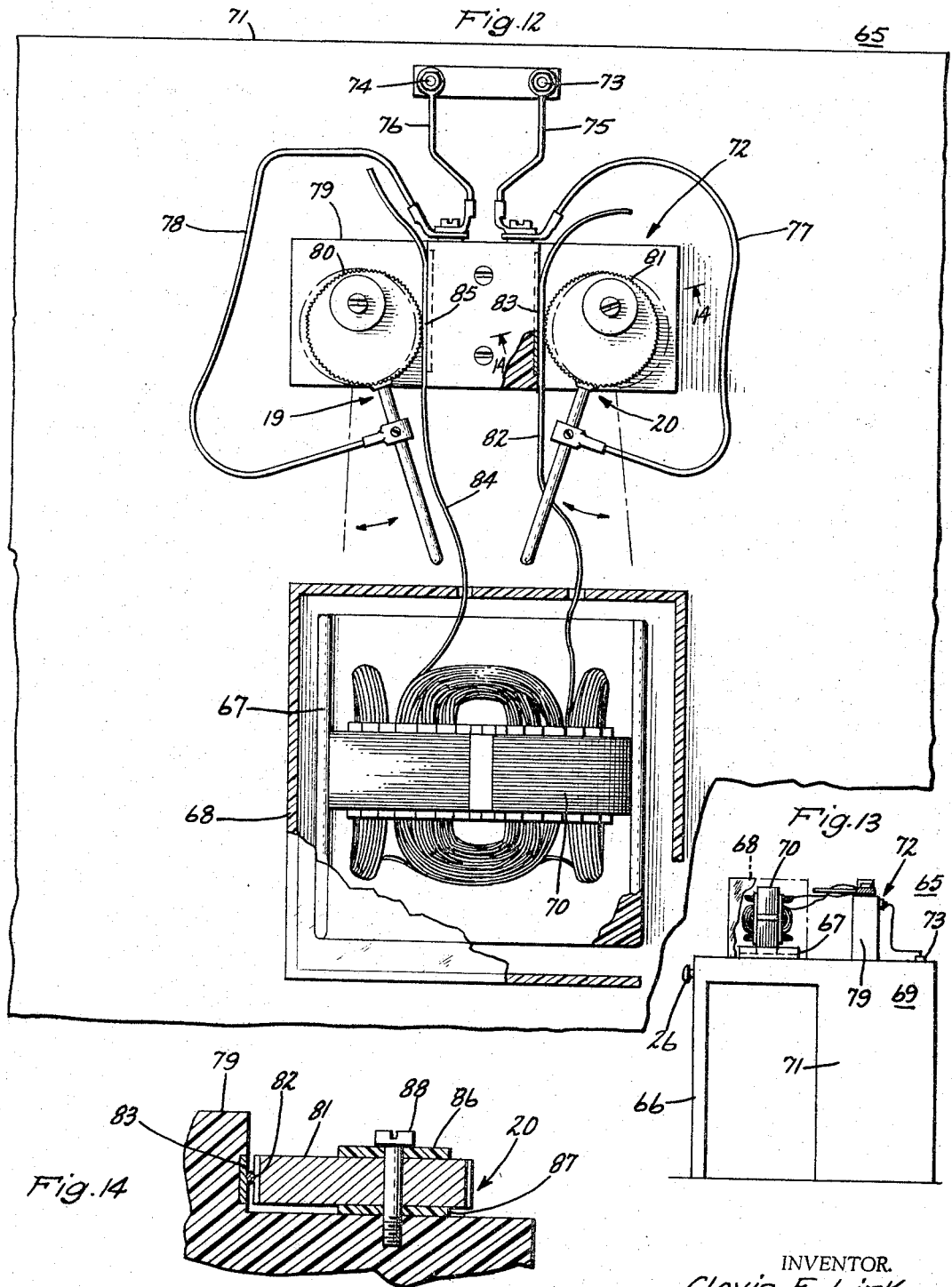

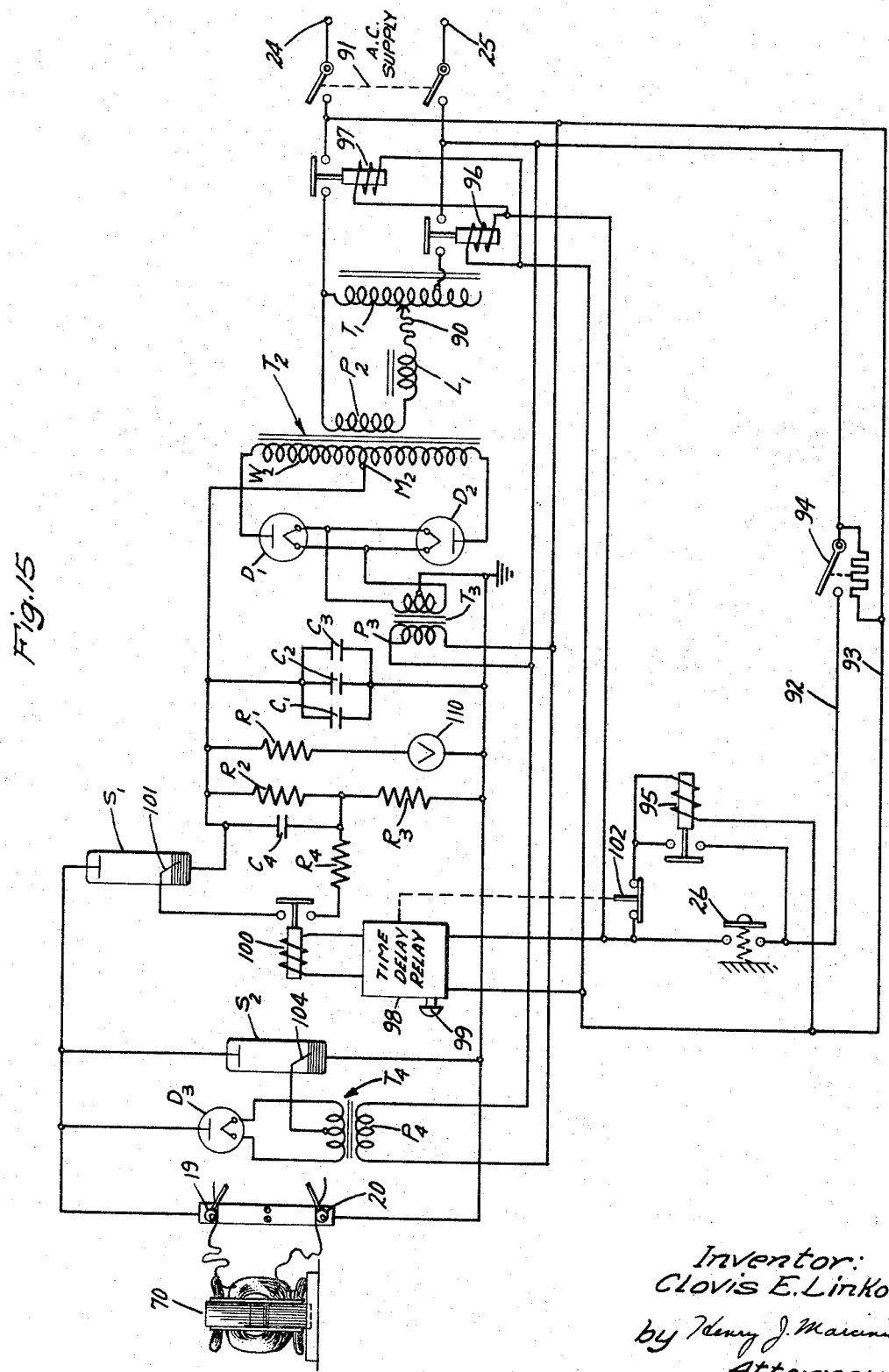

This invention relates generally to electrical coils. More particularly, it relates to a method for placing one or more electrical coils in desired spacial relationship with respect to a coil-accommodating member, including a magnetic core of inductive apparatus, such as a dynamoelectric machine and other equipment employing one or more electrical coils.

In the manufacture of inductive apparatus, such as, for example, small fractional horsepower motors, in which the turns of the electrical coils have to be positioned and packed in coil-accommodating slots of a magnetic core, it has been a long established practice to employ mechanical devices to force the turns of the side portions of the coils toward the bottom of the slots. The employment of such mechanical devices to effect a placement of the coils relative to the core has presented many difficulties in practice. Also, the slot space factor, which is the ratio of the slot area actually filled with conductor wire as compared with the available slot area, has not been entirely satisfactory in slots accommodating coils compacted therein by conventional methods. Generally, with conventional methods utilizing mechanical devices it has been difficult to economically achieve a space factor of 60 percent in practice because of the additional labor and effort required to more effectively compact the turns in the slots without causing damage to the insulation of the coil conductor wire.

The relatively lower cost of aluminum wire as compared to copper wire makes aluminum wire a more economically attractive material for mass produced motors. It will be appreciated of course, that aluminum wire does not have the conductivity of copper, and consequently for a given slot volume more aluminum wire must be packed into the slot. One of the principal drawbacks to the use of coils of insulated aluminum conductor wire for motor winding applications has been the difficulty experienced in economically achieving the higher space factor that would permit the use of aluminum conductor wire.

Accordingly, it is a general object of the present invention to provide an improved method for effecting the desired placement of an electric coil relative to the coil-accommodating member wherein the insulated electrical conductors of the side portions of the coil can be economically and effectively compacted with a more effective utilization of the coil-accommodating space. Also, another object of the present invention is to provide a novel and improved method for effecting a placement of the turns in the slots of a magnetic core, such as a dynamoelectric machine core wherein a relatively greater volume of conductor material can be packed into a given slot volume.

A continuing problem encountered with mechanical techniques for compacting and shaping windings has been that the mechanical forcing of the turns of coil side portions toward the bottom of the stator slots may result in abrasions and cuts on the insulation of the conductor wire. This problem is also present in the manufacture of many types of fractional horsepower motors where it is necessary to push back the end turn portions of the coils toward the side of the stator and away from the bore to provide access to the bore and to reduce the overall axial dimensions of the motor. Conventionally, the end turn portions of the coils have been pushed back mechanically by either pounding the end turns with a mallet or by the use of machines utilizing push members to engage and force the end turn portions of the coils away from the stator bore. An inherent disadvantage of such prior art techniques is that a mechanical device must be brought into physical contact with the wire insulation and this device may cause damage to the insulation. Further, the machines required to effectuate such operations add to the overall manufacturing costs of the motor.

It is therefore an object of the present invention to provide a novel and improved method for placing one or more coils in desired spacial relationship with respect to a magnetic core or other coil-carrying member without need for a mechanical device that must engage the coils in order ot effect the required placement of the coil or coils. In this connection, another more specific object of the present invention is to provide a novel and an improved method for placing coils in desired spacial relationship with respect to the core of a dynamoelectric machine wherein such coil-placing operations as, for example, pushing back the end turn portions of a coil, compacting the turns of the side portions and end turn portions, and moving the side turn portions of a coil toward the bottom of the coil-accommodating slots can be effectively and efficiently accomplished without the need for complex machinery.

According to one form of my invention I have provided a method for placing one or more coils in desired spacial relationship with respect to a coil-accommodating means like a magnetic core of a motor or other inductive apparatus, in which electromagnetic forces resulting from the interaction of currents and magnetic fields created by injecting a high electric power impulse into the coil or coils are used to effectuate the coil-placing steps or operations. The coil-placing operations accomplished by the action of these electromagnetic forces may involve, for example, pushing or forcing the individual turns of a coil side portion toward the bottom of a slot, compacting the individual turns of a coil to reduce the volume displaced by the coil portions in the slot and outside of the slot, and pushing back portions of the coils extending outwardly from the core.

In accordance with the principles of the present invention one or more of such coil-placing operations can be effectively accomplished by producing in the coil or coils one or a succession of high electrical power impulses. The magnitude of the power impulse to be supplied or otherwise produced in the coils is preselected so that it is sufficient to produce the desired manipulation of the entire coil or a portion thereof without exploding the conductor wire. In applications where insulated conductor wire is used, the power impulse should not detrimentally affect the conductor insulation.

As one illustrative example of an application of the principles of this invention, the improved method was developed for use in connection with the coil-placing operations required in the manufacture of induction motors. It will be appreciated that after the coils of a main running winding are inserted in the slots of the stator core, the coil side portions must be pushed back to the bottom of the slots to make room for an auxiliary starting winding and also to more effectively utilize the slot space. In addition, the end turn portions of the coils must be pushed back away from the stator bore.

The method as exemplified in the preferred embodiment of my invention includes the steps of producing in the coils at least one high electric power impulse of an intensity preselected to provide the desired placement of the coils without detrimentally affecting the insulation of the insulated conductor wire and without exploding the conductor wire. The operation of moving the turns of the coil side portions toward the bottom of the slots is effected by virtue of the electromagnetic forces resulting from the interaction of the currents and magnetic fields created in the region of the tooth sections of the magnetic core and in the vicinity of the turns of the coil side portions resulting from the surge of current flowing therethrough. Also, depending on the geometry of the core and the magnetic polarity of the adjacent poles defined by the coils, the operation of pushing back the end turn portions of the coils may concurrently be carried out with the other coil-placing operations by means of the electromagnetic forces acting on the end turn portions of the coils and resulting from the interaction of the magnetic fields in the region of the end turn coil portions and in adjacent portions of the magnetic core.

The improved method of the invention makes it possible in many motor applications to eliminate the need for costly and complex machines conventionally used to effect the coil-placing operations required in the manufacture of fractional horsepower motors. Further, the coil-placing operations are effectively accomplished without need for a pushing member that engages the coil turns. Thus, the possibility of causing damage to the insulation of the conductor wire due to abrasions and cutthroughs is minimized. Another important advantage of the improved method is that the space factor or the amount of conductor wire material per unit volume of slot can be significantly increased because of improved compaction and slot space utilization achieved by the method of the invention.

The subject matter which I regard as my invention is particularly pointed out and distinctly claimed in the concluding portion of the specification. The invention itself, however, together with further objects, applications and advantages thereof may be best understood by reference to the following description taken in conjunction with the accompanying drawings in which:

FIGURE 1 is a perspective view of a stator core with the coils of a main winding shown after insertion but before the coil-placing operations are carried out in accordance with one exemplification of the invention, the coils also being shown connected in series circuit with a power supply circuit capable of injecting in the coils an impulse of high electric power;

FIGURE 2 is an enlarged fragmentary view of one of the coil-accommodating slots of the stator shown in FIGURE 1, illustrating the distribution of the individual conductors after insertion of a coil side portion into the slot;

FIGURE 3 is a perspective view of a stator core showing the position of the coil side portions and the end turn portions of the coils after the high electric power impulse has been released through the coils in accordance with one form of the method embodying the present invention;

FIGURE 4 is an enlarged fragmentary view of a coil-accommodating slot of the stator core shown in FIGURE 3 and corresponds to the view shown in FIGURE 2, the view of FIGURE 4 illustrating the compaction achieved by the present invention;

FIGURE 5 is an end view of the stator core with the distribution and connections of the coils shown diagrammatically and with a general flux pattern illustrated schematically for one pair of adjacent portions of the groups of coils, the view showing the general pattern of the flux in a plane normal to the axis of the stator bore as set up by the adjacent poles in magnetic opposition;

FIGURE 6 is a fragmentary sectionalized view of the stator core, the section being taken axially through the center line of the magnetic poles and the view including a schematic representation of the general pattern of the flux in the plane passing of the section;

FIGURE 7 is a reduced fragmentary view of the upper group of end turn coil portions shown in FIGURE 6 illustrating the push-back achieved by successively producing a first and a second high power impulse in the coils in accordance with one form of the invention;

FIGURE 8 is a diagrammatic end view of the two pole stator core shown in FIGURE 5 but illustrating the coil distribution and electrical connections with the coil groups connected in parallel circuit relation, the coil groups defining poles in magnetic opposition with respect to each other;

FIGURE 9 is a simplified circuit diagram of the parallel-connected coil groups shown in FIGURE 8;

FIGURE 10 is an end view of a stator core for a four pole induction motor with the coil distribution and connections shown schematically, the coils being connected to define poles in magnetic opposition and in circuit with a power supply for producing a high power impulse in the coils, and a general flux pattern being shown schematically for two adjacent ends of a pair of the poles;

FIGURE 11 is a simplified schematic circuit diagram of the circuit connections of the coils corresponding to the view shown in FIGURE 10;

FIGURE 12 is a top view of the equipment used in carrying out the exemplified method of the invention;

FIGURE 13 is a reduced side view of the equipment;

FIGURE 14 is a fragmentary sectional view taken along lines 14—14 of FIGURE 12 and illustrating the manner in which the coil leads are connected in electrical circuit with the power supply without need for stripping the insulation from the end of the leads; and FIGURE 15 is a schematic circuit diagram of a power supply circuit adapted for producing a high power impulse for the purpose of carrying out the steps of one form of my invention.

For the purpose of explaining the principles of my invention, I have illustrated in FIGURES 1-7 various aspects of the improved method as applied to two coil groups 10 and 11 forming a main running winding 12 of a stator core 13 for a two-pole induction motor. The stator core 13 is shown in FIGURE 1 as it appears after the coils have been wound and inserted by a machine such as is disclosed in U.S. Patent 2,934,099 granted to Lowell M. Mason on Apr. 26, 1960. It will be noted that the end turn portions of the coil groups 10, 11 extend in an axial direction from the core 13 and the outermost end turn portions obstruct the entrance to the stator bore 15.

As will be seen in the sectional view of FIGURE 2, after the coil insertion operation the individual conductors 16 of a coil side portion are rather loosely distributed in the slot space. In particular, it will be noted that one of the conductors near the entrance 17 of the slot 14 is touching the core 13 and is not insulated electrically frorm grounding by the insulating slot liner 18. Essentially, in FIGURE 1 the coil groups 10 and 11 are shown as they appear before the method of the present invention is carried out.

In the exemplification of the invention which I have illustrated in FIGURES 1-7, the coil groups 10, 11 are arranged to provide two poles in magnetic opposition, and are connected in series circuit across terminal connectors 19 and 20 of a power supply circuit by means of leads 22 and 23. The terminals 24, 25 of the power supply circuit 21 are adapted for connection to an alternating current supply.

The power supply circuit 21 used in the illustrative exemplification of the invention is capable of supplying a high power impulse of 4920 joules at 4000 volts across the output terminal connectors 19, 20. When the pushbutton switch 26 is depressed, the operation of the power supply circuit is initiated. As will hereinafter be more fully explained, an impulse of pre-selected intensity is provided by first charging a capacitor bank to a selected voltage level controlled by a variable autotransformer and by discharging the capacitor bank through the coil groups 10, 11.

Preferably, in applying my invention to the coils for a two pole small fractional horsepower motor, I successively applied two high power impulses across the coil groups 10, 11 to effect the desired spacial relationship of the coils with respect to the core 13. The voltage level selected for the first high power impulse was 1000 volts, and the capacitor bank was discharged approximately 15 seconds after the pushbutton switch 26 was actuated to produce a high power impulse of about 307.5 joules. Immediately thereafter the voltage level on the capacitor bank of the power supply circuit 21 was set at 2000 volts. The pushbutton switch 26 was actuated, and 15 seconds later a second high power impulse of approximately 1230 joules was applied across the serially connected coil groups 10 and 11.

The dramatic results achieved are illustrated in FIGURES 3 and 4. The end turn portions of coil groups 10 and 11 have been pushed back and compacted. The stator bore 15 is now readily accessible. All of the insulated conductors 16 of the coil side portions, as will be seen from the illustration in FIGURE 4 of a cross-section of a representative coil side portion in a slot 14, are pushed toward the wall of the slot 14 (away from the opening). The proper spacial relationship of the coil side portions with respect to the core 13 is achieved since the coil side portions are pushed toward the bottom against the slot liner 18 of the slots 14 and compacted. The remaining slot space is now available for the turns of the start winding, which may also be placed in the desired spacial relationship with respect to the core 13 in accordance with the method of the present invention.

As is best seen in FIGURE 7, the first high power impulse applied to the coil groups 10, 11 causes the end turn portions to be pushed back from the initial position A shown in dashed outline to an intermediate position B. It will be noted that the end turn portions of the coil group 11 and the coil group 10 (not shown) are bunched together by the magnetic forces acting on each conductor. After the second high power impulse is applied, the coil group 11 is pushed further back toward the side of the core 13 to position C, and further compaction of the end turn portions is effected. An insulating member 28 may be placed next to the side of the core 13 to prevent possible grounding of any turns that might strike the core 13 as the push-back is effected.

A resistance reading was taken after the two high power impulses were applied, and this resistance, as measured in an ambient temperature of 25 degrees centigrade, was 1.395 ohms as compared to 1.38 ohms before pulsing. Based on observations of the coils immediately after pulsing, there was no significant temperature rise in the coils as could be sensed by placing one's hand on the coils. A visual examination of the insulated wire did not disclose any damage to the insulation of the conductor wire. A repetitive surge test at 3000 volts was carried out in accordance with NEMA (National Electrical Manufacturers Association) test standard MG1–12.05 dated Nov. 11, 1954. Also, a high potential test (Hi-pot) at 2000 volts was carried out on the winding in accordance with NEMA standard MG1–12.03 dated Nov. 17, 1949. Both of these test results were satisfactory.

The intensity of the initial high energy impulse was held at a relatively lower level than the second impulse to prevent the possibility of grounding conductor wires. As will be seen in FIGURE 2, after the conductors 16 are inserted in a slot, occasionally an individual conductor may come in direct contact with the stator core 13 near the entrance of the slot entrance 17. Preferably, where such a condition exists in practice, a first high power impulse of relatively lower intensity is applied across the coil groups 10, 11 to insure that the conductors 16 near the entrance 17 of the slot 14 are drawn toward the bottom of the slot 14, and that the slot insulating liner 18 effectively insulates all of the conductors 16 from possible grounding before the second high power impulse is applied.

In order to illustrate more clearly, how the invention, as described above, has been carried out in actual practice, I will now more fully describe the winding arrangement and the stator core 13. The stator core 13 is comprised of laminations punched from relatively thin magnetic sheet material and, as will be seen in FIGURE 5, includes a yoke section 30 and a plurality of spaced apart tooth sections 31 that project radially inward from the yoke section 30 to define twenty-four winding slots 14 and the rotor receiving bore 15.

The main winding 12 is arranged in the winding slots 14 to provide two primary poles, one pole being formed by the coil group 11 consisting of the coils 33, 34, 35, 36, 37 and the other pole being formed by coil group 10 consisting of coils 38, 39, 40, 41 and 42, respectively, each of the five coils being more or less symmetrically disposed about the radial center line 43 of the poles. The coils of the main winding 12 were wound with enameled copper wire having a nominal overall diameter of .0492 of an inch and a nominal bare wire diameter of .0435 of an inch. The enamel insulation on the conductor wire was a polyvinyl formal resin.

Although by way of illustration of one form of my invention, as applied to the specific stator winding arrangement shown in FIGURES 1, 3 and 5, two high power impulses were applied to effect the desired placement of the coils with respect to the stator core 13, it will be appreciated that if integral slot insulation were employed or if the turn coils were sufficiently pushed into the slots during the insertion process one high power impulse of a preselected magnitude may be used. The number of high power impulses to be used will, of course, depend upon the particular coil application. It will be appreciated that in many coil applications the desired spacial relationship of the coils with respect to a coil-accommodating member can be achieved by a single high power impulse as well as by a number of successively applied high power impulses of relatively lower magnitude.

Further, it will be apparent to those skilled in the art that although in the above described exemplification of my invention, the method was used to position, push-back and compact coils, it can also be used for other coil manipulating operations. For example, if it is desirable to remove the main winding 12 from the slots 14 of the core 13, the coil groups 10, 11 need only to be connected so that the magnetic poles are in aiding (North-South) relation. The coil groups 10, 11 are then energized with a high power impulse to effect a removal of the coils. When the high power impulse is applied, the two coil groups 10 and 11 are drawn together in the end turn region by the electromagnetic attraction into the bore 15 and the coils are thereby forcibly extracted from the slots 14. It will be appreciated that the forces exerted on the conductors 16 in the slots 14 are still in the direction toward the bottom of the slot.

If in a particular application it is necessary to shape the end turn portions of the winding 12, this can be readily accomplished with the improved method of my invention. To shape the end turn portions, a shaping die with a desired configuration may be rigidly positioned near the end turn portions so that when energized with the high power impulse, the end turn portions are forced against the die and thereby are shaped to the desired configuration.

Having more specific reference to FIGURES 5, 6 and 7, I will now more fully explain how the spacial placement of the coils is effected in accordance with my present understanding of the phenomena that occurs when the coils are suddenly subjected to the surge of current flow resulting from the application of a high electric power impulse. To indicate the direction of current flow I have used the conventional symbol $\oplus$ to denote that the direction of the current flow is downward through the drawing and the symbol ⊙ to denote that the direction of the current flow is outwardly of the drawing as seen in FIGURES 5 and 6.

When the coils are energized it will be understood that all of the turns in a given slot carry current. As the sudden impulse of current passes in the same direction through the turns of a coil side in any given slot, the interaction of the currents and the magnetic field set up by this sudden surge of current flow produces a force on the individual turns that drives the conductors 16 toward the slot bottom. The slot wall, of course, presents a restraint to further movement thereby resulting in additional compaction of the turns of the coil side portions. It will be understood that near the bottom of the slot 14 (radially outward portion) there is a significant mass of ferromagnetic material in the yoke section 30 which can carry the flux produced by the bundle of conductors 16 in a given slot. However, at the top of the slot (radially inward portion) an appreciable amount of flux will cross the slot near the entrance 17. The magnetic field strength at the top of the slot 16 will be relatively greater than the field strength at the bottom, because the air gap is greater while the core is still in the unsaturated condition. Due to the interaction of the magnetic field and currents in the region of the tooth sections 31 and in the vicinity of the coil side portions resulting from the surge of current flow through the coils, a force is exerted on the conductors 16 of the side portions in essentially a radially outward direction or, in other words, toward the bottom of the slot. After the core 13 saturates, the conductors 16 are essentially squeezed together.

The squeezing and pushing of the conductors 16 of the coil side portions toward the bottom of the slots are precisely the effects desired in a stator coil-placing operation to achieve the best space utilization in a given slot. With the improved method of the invention it is not only possible to force or squeeze the individual conductors 16 of the coil side portions together but also to move the compacted bundle turns 16 toward the bottom of the slot 14 without utilizing a mechanical device for applying the required forces. Also, it will be appreciated that an important advantage of the invention is that a concurrent squeezing or compacting effect in the end turn region can be obtained that could not be achieved with conventional mechanical devices.

For the purpose of explaining the invention, I have illustrated in FIGURES 5 and 6 a schematic representation of the flux pattern near the end portion of the stator core 13 (FIGURE 5) and in a plane taken through the axial center line 43 of the poles (FIGURE 6). As will be seen from the flux portions shown in FIGURE 5, the interaction between the magnetic fields between adjacent ends of the coil groups 10 and 11 near the stator core 13 should result in electromagnetic forces exerted on the coils to effect a push-back of the coil groups 10, 11 away from each other.

Referring now to the flux pattern shown in FIGURE 6, it will be noted that the surge of current flow in the turns of the five coils 33, 34, 35, 36 and 37, which define one of magnetic poles, produces a magnetic field around the end turn portions with a resulting flux having a direction that is essentially counterclockwise as seen in the drawing. The surge of current flow through the end turn portions of the coils 38, 39, 40, 41 and 42, which define the other or opposing magnetic pole, produces a magnetic field with a resulting flux generally flowing in a clockwise direction as seen in FIGURE 6. In effect, the end turn portions of the two coil groups 10, 11 behave like two parallel cables carrying current in the opposite direction. It will be seen that the direction of the lines of the flux between the end turn portions in the vicinity of the bore entrance is such that the magnetic field in this region of the end turn portions is reinforced. Electromagnetic forces resulting from the interaction of the magnetic fields in the region of the end turn portions cause the end turn portions of the coil groups 10, 11 to be pushed apart away from the bore entrance toward the side of the stator core 13. Further, as is best seen in FIGURE 7, as the end turn portions are progressively pushed back against the side of the stator core 13, the turns of the respective coils of groups 10 and 11 are drawn together so that the outermost portions of the coils are squeezed into a relatively compact bundle.

From the foregoing explanation and description of the exemplification of the invention as applied to motor windings, it will be apparent that a number of optimum benefits can be derived. Not only can the desired spacial relationship of the side portions of the coils with respect to the stator core be achieved economically and with improved slot space utilization but in the same operation the end turn portions can be pushed back and compacted.

Referring now to FIGURES 8 and 9, I have illustrated therein schematic circuit diagrams of the coil connections for the two-pole stator 13 with the same coil distribution as in the previously described embodiment but with the coil groups 10 and 11 connected in parallel circuit relation across the output terminals 19 and 20 of the power supply circuit. In view of the similarity between the embodiment illustrated in FIGURES 8 and 9 and in the previous figures of the drawing, I have used the same reference numerals to identify corresponding parts.

As is shown in FIGURE 8, the two coil groups 10, 11 include five coils symmetrically disposed with respect to the pole axis 43 to define two poles in magnetic opposition. It will be noted that innermost coils 33 and 38 are connected in electrical circuit by conductor 46 and that the outermost coils 37, 42 are joined in electrical circuit by conductor 47 to form two parallel circuit branches including the coil groups 10, 11. The two parallel circuit branches are connected by electrical leads 48 and 49 across the terminal connectors 19, 20 of the power supply circuit 21, as is best seen in the simplified schematic circuit diagram of FIGURE 9.

In order to achieve the desired spacial relationship of the coils with respect to the magnetic core 13, three high electric power impulses were successively produced in the coil groups 10, 11. For the first high power impulse the capacitor bank of the power supply circuit was set at 1000 volts to provide 307.5 joules of energy. After application of this first impulse it was observed that the coil turns were drawn into the slots and the end turn portion of the coils were slightly pushed back. The second power impulse of 692 joules was produced by discharging the capacitor bank when charged to 1500 volts. A further movement of the coil turns was effected, and the end turn portions of the coil groups 10, 11 were pushed back to a position ranging from approximately ¼ to ½ of an inch from the sides of the stator core 13. To obtain the final desired placement of the end turn portions with respect to the stator core 13, a third impulse of 1230 joules was applied across the coil groups 10, 11 by discharging the capacitor bank at 2000 volts. This third impulse resulted in a push-back of the end turn portions to within ⅛ of an inch from the stator core 13. The appearance of the coil groups 10 and 11 were essentially as is shown in FIGURE 3. No significant temperature rise could be detected by feeling the end turn portions. A 3000 volt repetitive surge test (NEMA standard MG1–12.05) and a 2000 volt high potential test (NEMA standard MG1–12.03) were carried out on the winding, and the results were satisfactory.

Having more specific reference now to FIGURES 10 and 11, I have shown how the principles of the present invention can be applied to the main winding 50 of a four pole induction motor. As is shown in FIGURE 10, the four poles are formed by coil groups 51, 52, 53 and 54, each having three coils 55, 56 and 57 symmetrically disposed within the slots 58 of a stator core 59 about a radial center line 60 of the pole. The outermost coil 55 embraces a total of eight stator tooth sections 61. The intermediate coil 56 spans six tooth sections 61 while the innermost coil 58 spans four tooth sections 61. The coils of the main winding 50 were wound with insulated copper conductor wire having a nominal bare wire diameter of .0359 of an inch and a nominal overall diameter of approximately .0395 of an inch. The wire was insulated with an enamel consisting of a polyvinyl formal resin. Coils 55, 56 and 57 were wound with 48, 42 and 32 turns respectively.

As will be apparent from the simplified schematic circuit diagram shown in FIGURE 11, the coil groups 51 and 52 are connected in series circuit in one parallel circuit branch while the other coil groups 53 and 54 are connected in series circuit in another parallel circuit branch. Electrical leads 62 and 63 connect the two parallel circuit branches across the terminal connectors 19 and 20 of the power supply circuit. With the connections as shown in FIGURES 10 and 11, the coil groups 51, 52, 53 and 54 define poles which are all in opposing relation or, in other words, have the same magnetic polarity.

Referring now more specifically to FIGURE 10, I have shown therein a schematic representation of the general flux pattern in the vicinity of the adjacent poles defined by coil groups 52 and 53, as I understand the applicable phenomena that takes place, when the high power impulse is applied across the coil groups 51, 52, 53 and 54. The two adjacent poles defined by coil groups 52 and 53, as well as the other pair of adjacent poles defined by coil groups 51 and 54, are in opposing relation. As in the other aforedescribed exemplifications of the invention, the surge of current flow through the coils produces a combined squeezing and push-back of the end turn portions. In addition, the bundle of the insulated conductors of the coil side portions in each of the slots 58 are concurrently pushed toward the bottom of the slot and compacted by virtue of the magnetic fields set up by the surge of current flow.

In order to illustrate more clearly how the method of my invention, as described above, has been satisfactorily carried out and reduced to practice, I will now more specifically describe the steps utilized in placing the coils of main winding 50 in the desired spacial relationship with respect to the stator core 59. A first high power impulse was applied by discharging the capacitor bank of the power supply circuit 21 when charged to a 1000 volt level (307.5 joules). A slight movement of the coil side and end turn portions was observed but the movement effected was not satisfactory. I then charged the capacitor bank of the power supply circuit 21 to 2000 volts (1230 joules) and discharged the capacitor bank through the coil groups 51, 52, 53 and 54. It was noted that the turns of the coil side portions were further moved back into the slots 58 and that the end turn portions of the coils were straightened out. A third high power impulse was applied to the main winding 50 by discharging the capacitor bank after it was charged to 4000 volts (4920 joules). During the application of the third high power impulse there was no clearly discernible movement of the coils but a greater degree of compaction of the coils was achieved.

After the application of the third high power impulse, the placement of the coils with respect to the stator core 59 was satisfactory. The resistance of the main winding 50 was measured and found to be in the amount of .780 ohm. By way of comparison, the resistance of the main winding 50 was .727 ohm before the coil-placing operations were carried out in accordance with the present invention. A 3000 volt repetitive surge test (NEMA standard MG1-12.05) and 2000 volt high potential test (NEMA standard MG1-12.03) were carried out on the winding 50 with satisfactory results.

From the foregoing description of the various exemplifications of the invention as applied to motor windings it will be apparent that with the adjacent poles arranged in magnetic opposition when the high power impulse is applied, the forces exerted on the end turn portions cause them to be pushed apart. Further, with adjacent poles in magnetic opposition a high power impulse of less intensity is required to produce a given level of force on the turns in the slots, and the voltage stress on the insulation of the conductors in the slots can be reduced, as compared with applications of the invention in which adjacent poles are in magnetic aiding relation (North-South).

As will be evident from the specific examples of my invention set forth above, one or more high power impulses of sufficient magnitude were injected into the coils that would effect the desired coil-placing operations. The force level which must be produced on the conductors of the coils to effect the desired coil-placing operations will depend upon such factors as wire size, the type of wire material, the geometry of the stator core, the configuration of the end turn portions and other parameters. The surge of current flow required to produce the desired forces on the coil conductors must not have a detrimental effect on the insulation of the conductors and must not explode the conductor. Thus, the magnitude or intensity of the high power impulse to be applied to a coil or coils in a particular application can be best determined by applying impulses of varying levels and selecting one or more of these levels that will accomplish the desired coil-placing operations.

Turning now to FIGURES 12, 13 and 14, I have illustrated therein an apparatus 65 that can be used to carry out the method of the present invention. The apparatus 65 includes a table 66 for supporting a fixture 67, a transparent plastic hood 68, and the power supply 69. As is shown in FIGURES 12 and 13, a four-pole stator core 70 is supported in the fixture 67. The power supply 69 includes a cabinet 71 for housing the power supply circuit, the push button switch 26 mounted at the front of the table 66 for operating the power supply circuit, and a connector assembly 72. A pair of output terminals 73, 74 at the top side of the power supply cabinet 71 are connected to the connector assembly 72 by means of leads 75, 76. The connector assembly 72 is comprised of a pair of flexible leads 77, 78, the terminal connectors 19, 20 and a support base member 79. It will be seen that the terminal connectors 19, 20 are supported on the base member 79 for eccentric rotational movement and are formed with serrated cylindrical portions 80, 81.

When the right hand terminal connector 20 is rotated in a clockwise direction, as seen in FIGURE 12, the serrated cylindrical portion 81 forces the conductor wire lead 82 against the metallic back piece 83. The serrations on the outer surface of the cylindrical portion 81 scrape and cut through the insulation on the wire lead 82 to quickly establish a good electric contact between lead 82 and the output terminal 73 of the power supply circuit. Similarly, the left hand terminal connector 19 is rotated to establish a good electrical connector between terminal 74 of the power supply circuit and wire lead 84 of the motor winding. The serrated cylindrical portion 80 when rotated in a counterclockwise direction forces wire lead 84 against a metal back piece 85.

As will be seen in the fragmentary sectional view of FIGURE 14, the cylindrical portion 81 of the terminal connector 20 is rotatably supported between two insulating washers 86 and 87 on a shaft screw 88 threaded into the support member 79. By rotating the right hand terminal connector 20 in a counterclockwise direction and the left hand terminal connector 19 in a clockwise direction, the wire leads 82, 84 can be readily disengaged. It will be apparent that this connector arrangement permits wire leads from a motor winding to be readily coupled and uncoupled from the power supply circuit without need for stripping the wire leads 82, 84.

The transparent plastic hood 68, as is shown in FIGURES 12 and 13, covers the stator core 70 in order to protect operating personnel from possible injury in the event that the winding should accidentally ground or explode as a result of the application of the high power impulse. Also, to provide additional safety the transparent plastic hood 68 had an interlock switch (not shown) that was closed only when the hood 68 was in position over the stator core 70 so that the operation of the power supply circuit could not be initiated unless the hood 68 was properly in position over the stator core 70.

In FIGURE 15, I have illustrated a simplified circuit diagram of the power supply circuit 21 shown in other figures of the drawings in block diagram form. As will hereinafter be more fully explained, a bank of three parallel-connected storage capacitors $C_1$, $C_2$ and $C_3$ controllably chargeable to voltage levels between 500 and 4000 volts, are discharged to provide a high electric power impulse of preselected magnitude by switching an ignitron $S_1$ into conduction. The component parts of the power supply circuit 21 are housed in the cabinet 71 shown in FIGURE 13. The terminals 24, 25 are adapted for connection to a suitable alternating supply, such as 120 volt, 60 cycle commercial supply and in the actual circuit consisted of a plug for use with a grounded type of receptacle. A main on-off switch 91 is provided to make the line power available for the various operating components. When switch 91 is closed, it will be seen that the primary windings $P_3$, $P_4$ of the filament transformers $T_3$, $T_4$ are immediately energized. It will be noted that the leads 92 and 93 connected to the operating pushbutton switch 26 are not energized until after a predetermined interval as determined by the bimetallic time delay switch 94. This arrangement insures that plate voltage cannot be applied on the rectifier tubes $D_1$, $D_2$ and $D_3$ until the grids of the rectifier tubes have been warmed up for at least 30 seconds. The rectifier tubes $D_1$, $D_2$ and $D_3$ were of the liquid vapor type and required a warm-up period.

To set the voltage level on the bank of capacitors $C_1$, $C_2$ and $C_3$, the movable arm or tap of the autotransformer $T_1$ is adjusted to provide the selected voltage level. In the exemplification of my invention, the magnitude of the high power impulse produced in a winding was selectively controlled by varying the voltage level to which the capacitors $C_1$, $C_2$ and $C_3$ were charged. The charging of the capacitor bank is initiated by depressing the pushbutton switch 26. The momentary closing of switch 26 causes the normally open relay 95 to close. With the closing of relay 95, the coils of the two normally closed relays 96 and 97 are energized to cause the alternating current supply to be applied across the autotransformer $T_1$. Also, simultaneously with the closing of relay 95, time delay relay 98 is energized. After a time delay as determined by the setting on the control 99, the contactor 100 is closed to cause a positive potential to be applied at the starter rod 101 of the ignitron $S_1$ and switch the ignitron $S_1$ to a state of conduction. A short interval thereafter the time delay relay 98 momentarily opens the contacts 102 to restore the relays 95, 96 and 97 to their normally open condition.

The time delay relay 98 used in the power control circuit 21 is of a conventional type and is driven by a small synchronous motor coupled to a gear train. At the end of the time delay interval, the contacts of a microswitch are closed to energize the contactor 100.

Ignitrons $S_1$ and $S_2$ used in the circuit 21 are mercury-pool cathode-arc rectifiers with a starter rod immersed in a mercury pool. When a positive potential is applied at the starter rod, sparking occurs at the junction of the rod and mercury pool that results in the formation of a cathode spot, and the anode passes current.

To illustrate the operation of the power supply circuit 21 as utilized in the exemplification of my invention, let us assume that the on-off switch 91 is closed and that it is desired to supply a high power impulse by discharging the capacitor bank after the capacitor $C_1$, $C_2$ and $C_3$ have been charged to 4000 volts. The adjustable arm 90 on the control autotransformer $T_1$ is set to provide a voltage of 4000 volts between the center point $M_2$ and one end of the secondary winding $W_2$ of the step-up transformer $T_2$. The time delay control 99 is set to provide a 15 second delay after charging of the capacitor bank is initiated to insure that the preselected voltage level on the capacitors $C_1$, $C_2$ and $C_3$ is achieved before they are discharged through a winding connected across the terminal connectors 19 and 20. With the filament transformers energized for an interval of thirty seconds or more, the grids of the high voltage rectifiers are now warmed up, the time delayed switch 94 closes, and power is applied to the leads 92, 93. The power supply circuit is now in a standby condition, and the charging of the capacitor bank can be initiated at the will of the operator.

To initiate the charging of the capacitor bank, the pushbutton switch 26 is depressed to actuate the relays 95, 96 and 97 thereby energizing this time delay relay 98 and control autotransformer $T_1$. The output of the control autotransformer $T_1$ is applied across the primary winding $P_2$ of step-up transformer $T_2$. The peak current through the primary winding $P_2$ is limited by a choke $L_1$ connected in series with the primary winding $P_2$. The current to the capacitors $C_1$, $C_2$ and $C_3$, is rectified by diodes $D_1$ and $D_2$ connected in the secondary circuit of the step-up transformer $T_2$. The voltages between each end of the secondary winding $W_2$ and the center tap $M_2$ are of equal value and 180 degrees out of phase with each other. When the voltage induced in the secondary winding $W_2$ is of such polarity that its upper end is positive with respect to the center tap $M_2$, the plate of the high voltage rectifier $D_1$ becomes positive with respect to its cathode. The rectifiers $D_1$ and $D_2$ alternately conduct in conformance with the changing polarity of the input voltage.

In order to permit readings to be taken of the voltage level on the capacitors $C_1$, $C_2$ and $C_3$ a voltmeter is connected in series with a multiplier resistor $R_1$ across the capacitor bank.

The full wave rectified output was also utilized for the purpose of charging a capacitor $C_4$ through a voltage divider consisting of resistors $R_2$ and $R_3$. Approximately four-tenths of the full wave rectified voltage is applied across the capacitor $C_4$. A resistor $R_4$ is connected in the discharge circuit of the capacitor $C_4$ to control its discharge rate when the contactor 100 is actuated to the closed position.

After the capacitors $C_1$, $C_2$ and $C_3$ are charged to 4000 volts, the 15 second time delay period will have run out, and the time delay relay 98 energizes the contactor 100 to close and cause the capacitor $C_4$ to discharge through the starter rod 101 of ignitron $S_1$ to force it into conduction. When the ignitron $S_1$ conducts, it functions as a switch and causes the capacitors $C_1$, $C_2$ and $C_3$ to discharge through the winding connected across the terminal connectors 199 and 20 of the power supply circuit 21.

When the polarity of the voltage across the terminal connectors 19, 20 reverses, the voltage on the plate of the high voltage rectifier $D_3$ will become positive, and the rectifier $D_3$ is triggered into conduction. With rectifier $D_3$ conducting, a positive potential is applied at the starter rod 104 of ignitron $S_2$, and ignitron $S_2$ is fired to provide a path for reverse current flow. Thus the reverse current flow shunts the capacitors $C_1$, $C_2$ and $C_3$.

If a second high power impulse needs to be supplied to a winding, the arm 90 on the control transformer $T_1$ is adjusted to provide the voltage level on the capacitors $C_1$, $C_2$ and $C_3$ that will produce an impulse of the desired energy level. If a longer time delay interval is required, the time delay control 99 is adjusted to provide a time delay interval corresponding to the new voltage. The pushbutton switch 26 is then depressed to initiate the charging of the capacitors $C_1$, $C_2$, $C_3$ and to discharge these capacitors after a prescribed time interval to provide a second high power impulse through the winding.

By way of a more specific illustration of a power supply circuit used in the practice of the invention, the components of the power supply circuit illustrated in FIGURE 15 are more particularly identified as follows:

| | |
|---|---|
| Control autotransformer $T_1$ | General Electric 9H60LA10X. |
| Transformer $T_2$ | Stancor P–8034. |
| Choke $L_1$ | Stancor C–2688, —.010 henries. |
| Rectifiers $D_1$, $D_2$, $D_3$ | Mercury vapor rectifiers 872A. |
| Filament transformer $T_3$ | Stancor 5 volt, 15 amperes P–6433. |
| Filament transformer $T_4$ | Stancor 5 volt, 10 amperes P–6135. |
| Ignitrons $S_1$, $S_2$ | GL–5550 Ignitron. |
| Capacitors $C_1$, $C_2$, $C_3$ | Each rated at 210 microfarads, 5000 volts. |
| Capacitor $C_4$ | .05 microfarad, 2000 volts. |
| Resistor $R_1$ | 5 megohms. |
| Resistor $R_2$ | 2 megohms. |
| Resistor $R_3$ | 3 megohms. |
| Resistor $R_4$ | 20 megohms. |

It will be appreciated that the improved method of this invention may be used in connection with other types of supply circuits that are capable of controllably supplying a high electrical power impulse of the desired intensity to one or more coils. Further, with respect to the application of the improved method to motor windings, it has been possible with high power electrical impulses applied in accordance with the invention to accomplish the desired placement of motor windings in a magnetic core in a rapid and economical manner without need for heavy machinery or equipment and without need for mechanical devices that engage the windings to forcibly effect the desired placement. In addition, it is possible not only to achieve a squeezing together or compaction of the individual turns of a coil but also at the same time to effect the push-back of the end turns and to effect a more efficient distribution of the individual turns within the slots thereby to significantly improve the slot space factor. Because of the improved slot space factor, it has been possible in some motor applications to substitute relatively less expensive insulated aluminum conductor wire for copper wire. With the elimination of mechanical forcing of the turns of coils, it will be apparent that the possible damage to wire insulation resulting from ruptures of the insulation is greatly reduced.

Although the principles of my invention may be used advantageously in connection with the placement of motor windings in their proper spacial relationship with respect to a core, it will be apparent to those skilled in the art that the principles of the invention may also be employed effectively in other electromagnetic and inductive apparatus where it is desired to position, compact or otherwise place a coil in some desired spacial relationship with respect to a coil-accommodating member. As utilized in preferred embodiments of the invention the improved method provides an economically effective solution to the problems associated with coil space utilization and proper placement of coils. This invention offers definite advantages in its application to motor windings in general but it also offers similar advantages in its applications to the placement and physical compaction of other types of electrical coils.

It will be apparent that many modifications may be made to the methods and apparatus disclosed herein without departing from the invention. It is, therefore, intended in the appended claims to cover all such equivalent modifications and variations that fall within the true spirit and scope of the invention.

What I claim as new and desire to secure by Letters Patent of the United States is:

1. A method for placing a coil in desired spacial relationship with respect to a dynamoelectric machine core having a yoke section and a plurality of angularly spaced apart tooth sections extending from the yoke section to define a number of slots accommodating side portions of the coil, said coil formed of turns of insulated conductor wire, and said side portions insulated from the walls of the slots and said method comprising the steps of: producing in the coil at least one high electric power impulse of a magnitude preselected to achieve the desired placement of the coil relative to the core without detrimentally affecting the insulation of the insulated conductor wire and without exploding the insulated conductor wire, said high electric power impulse causing a surge of current flow through the turns of the coil; and moving the turns of the side portions of the coil toward the bottom of the slot by means of electromagnetic forces resulting from the interaction of the current in the turns and magnetic field created across the slots by the surge of current flow through the coil.

2. A method for compacting conductors of electrical coils having side portions disposed in slots formed on a core of a dynamoelectric machine and having walls for receiving said side portions, said method comprising the steps of: producing in the electrical coils at least one high electric power impulse with an energy level preselected to provide a desired compaction without exploding a conductor, said high electric power impulse causing a surge of current flow through the coils; effecting a movement of the conductors of the side portions against the walls of the slots by means of the interaction of the currents in the conductors and magnetic field in the region of the conductors of the side portions and adjacent parts of the core, and concurrently effecting a compaction of the conductors of the side portions of the coil by virtue of the resulting restraint against further movement of the conductors presented by the walls of the slots.

3. A method for placing groups of coils in desired spacial relationship with respect to a dynamoelectric machine core having a central bore and a plurality of angularly spaced apart tooth sections defining a number of slots accommodating side portions of the coils, said groups of coils spanning preselected numbers of tooth sections to form magnetic poles and having end turn portions extending from the slots, said coils wound of turns of insulated conductor wire and said method comprising the steps of: arranging the groups of coils to provide adjacent magnetic poles in opposing relation; producing in said coils at least one high electric power impulse having an energy level preselected to achieve the desired placement of the end turn portions without detrimentally affecting the insulation of the insulated conductor wire, said high electric power impulse causing a surge of electrical current flow through the coils; and effecting a movement of the end turn portions of the coils toward the side of the magnetic core and away from the bore by means of the electromagnetic forces resulting from magnetic fields created in the region of the end turn portions and adjacent portions of the core by virtue of the surge of current flow passing through the coils.

4. A method for placing coils in a desired spacial relationship with respect to a dynamoelectric machine core having a yoke section with a plurality of angularly spaced tooth sections extending therefrom to define slots with walls accommodating insulated conductors of side portions of the coils, the end turn portions of the coils extending outwardly from the slots, said coils formed of turns of insulated conductor wire and said side portions insulated from the core, said method comprising the steps of: producing at least one high electric power impulse in the coils of a magnitude preselected to effect the desired placement, said high electric power impulse thereby causing a surge of electrical current flow through the coils; and concurrently (a) effecting a movement of the side portions of the coils toward the walls of the slots by means of the electromagnetic forces resulting from the interaction of the magnetic fields created in the region of the tooth sections and the insulated conductors of the side portions of the coils by said surge of current flow, and (b) effecting a push-back of the end turn portions of the coils toward the side of the core by means of the electromagnetic forces resulting from the interaction of the currents in the end turn portions and the magnetic fields created in the region of the end turn portions and the portions of the core adjacent thereto.

5. A method for placing an electrical coil in desired spacial relationship with respect to a coil-accommodating core member with conductors of at least a portion of the electrical coil disposed adjacent to a wall of the coil-accommodating member, said method comprising the steps of: producing across the electrical coil conductor portion at least one electric power impulse of an intensity preselected to provide the desired spacial relationship of the electrical coil relative to the core member without exploding a conductor, said electric power impulse generating a surge of current flow through the conductor portion of the electrical coil; and effecting a movement of the conductor portion of the electrical coil toward the wall of the coil-accommodating core member by means of the forces acting on the conductors resulting from the interaction of the currents and magnetic fields created in the region of the coil-accommodating core member and the portion of the electrical coil disposed in the coil-accommodating core member.

6. A method for compacting insulated conductors of at least one electrical coil formed of turns of insulated conductor wire and having at least a portion thereof disposed in a coil accommodating member, said method comprising the steps of: producing in the electrical coil a first high electric power impulse of a magnitude preselected to achieve an initial compaction of the coil relative to the magnetic core, said first high electric power impulse causing a first surge of current flow through the coil; effecting an initial compaction of the coil by electromagnetic attraction between the insulated conductors of the coil arising from the interaction of the magnetic field established in the vicinity of the conductors by the first surge of current flow passing in the same direction therethrough; producing a second high electric power impulse of a magnitude preselected to provide further compaction of the coil, said second high electric power impulse causing a second surge of current flow through the coil; and effecting a further compaction of the coil by electromagnetic attraction between the insulated conductors of the coil arising from the interaction between the magnetic fields established in the vicinity of the insulated conductors by the second surge of current flow passing in the same direction therethrough.

7. A method for placing an electrical coil in desired spacial relationship with respect to a coil-accommodating member with conductors of at least a portion of the electrical coil disposed adjacent to a wall of the coil-accommodating member, said method comprising the steps of: injecting into the electrical coil at least one high electric power impulse of an intensity preselected to effect the desired placement of the portion of the electrical coil in the coil-accommodating member, said high electric power impulse causing a surge of current flow through the conductors of the electrical coil; effecting a movement of the insulated conductors of the portion of the electrical coil disposed in the coil-accommodating member toward the wall thereof by means of electromagnetic forces acting on the conductors and resulting from the interaction of the magnetic fields created in the region of the turn-accommodating member and said portion of the electrical coil by virtue of the surge of current flow through the conductors, and concurrently effecting the desired spacial relationship of the portion of the electrical coil by the attraction of the insulated conductors arising by virtue of the interaction between the magnetic fields established by the surge of current flow passing in the same direction through the conductors.

8. A method for compacting side portions of electrical coils of a dynamoelectric machine having a stator formed with angularly spaced slots with walls accommodating insulated conductors of the side portions, said coils wound of insulated conductor wire and having end portions extending from the slots, said method comprising the steps of: releasing into said electrical coils a high electric power impulse of an intensity preselected to provide a desired amount of compaction without exploding the insulated conductor wire, said high electric power impulse causing a surge of electrical current flow through the coils; effecting a movement of the insulated conductors of the side portions of the coils toward the walls of the slots by electromagnetic forces acting on said insulated conductors and resulting from the interaction of the currents and magnetic field created in the region of the slots and side portions of the coils by virtue of said surge of current flow therethrough; and concurrently effecting a compaction of the insulated conductors of the side portions of the electrical coils by means of the constraint against further movement presented by the slots.

9. A method of placing at least a portion of electrical conductor turns in a desired spacial relationship with respect to a turn-accommodating member, with a portion of the turns extending beyond the member and another portion being received in the turn-accommodating member, the method comprising the steps of: generating in at least a predetermined portion of the turns one or more electric power impulses of an intensity preselected to cause one or more surges of current flow through said predetermined portion and create a magnetic field in the vicinity of said predetermined portion and also preselected to effect the desired spacial relationship of the predetermined portion relative to the member, and effecting said desired spacial relationship by movement of said predetermined portion to attain the desired spacial relationship thereof relative to the turn-accommodating member produced by electromagnetic forces resulting from the current flow and magnetic field.

10. A method of effecting movement and a desired spacial relationship of at least a portion of electrical conductor turns with respect to a turn-accommodating magnetic core member, with end turn portions of the conductor turns extending beyond at least one end face of the magnetic core member and with side turn portions being received in turn-accommodating means of the magnetic core member, the method comprising the steps of: generating in at least the end turn portions at least one electric power impulse of an intensity preselected to cause at least one surge of current flow through the end turn portions and create a magnetic field in the vicinity of said end turn portions and also preselected to achieve the desired movement and the desired spacial relation of the end turn portions relative to the magnetic core member, and effecting the desired movement of the end turn portions, and the desired spacial relationship thereof relative to the magnetic core member by electromagnetic forces acting on the end turn portions which are produced from the at least one current flow and magnetic field.

(References on following page)

References Cited

UNITED STATES PATENTS

| | | | |
|---|---|---|---|
| 2,377,175 | 5/1945 | Peer | 318—220 |
| 2,506,173 | 5/1950 | Polard | 29—205 |
| 2,691,306 | 10/1954 | Beams et al. | 310—166 |
| 2,976,907 | 3/1961 | Harvey | 153—10 |
| 3,092,165 | 6/1963 | Harvey | 153—2 |
| 3,115,857 | 12/1963 | Pfanner | 113—44 |

OTHER REFERENCES

Furth et al.: Scientific American, vol. 198, February 1958, pp. 28–33.

Seely: Introduction to Electromagnetic Fields, 1958, McGraw-Hill, pp. 269–274.

Moulin: The Principles of Electromagnetism, 2nd edition, 1950, Oxford at the Clarendon Press, pp. 234 and 235.

Crow: Design, Construction and Operating Principles of Electromagnets for Attracting Copper, Aluminum and Other Non-Ferrous Metals; 1951; The Scientific Book Publishing Co.; p. 22.

Geary: Magnetic and Electric Suspensions; 1964, SIRA Research Report R 314; pp. 61–65.

JOHN F. CAMPBELL, *Primary Examiner.*

J. L. CLINE, *Assistant Examiner.*